United States Patent
Smith

(10) Patent No.: US 10,783,795 B2
(45) Date of Patent: Sep. 22, 2020

(54) LANDING SYSTEM FOR AN AERIAL VEHICLE

(71) Applicant: GE Aviation Systems Limited, Cheltenham, Gloucestershire (GB)

(72) Inventor: Mark Andrew Smith, Worcester (GB)

(73) Assignee: GE Aviation Systems Limited, Cheltenham (GB)

(*) Notice: Subject to any disclaimer, the term of this patent is extended or adjusted under 35 U.S.C. 154(b) by 0 days.

(21) Appl. No.: 16/004,106

(22) Filed: Jun. 8, 2018

(65) Prior Publication Data
US 2019/0027048 A1  Jan. 24, 2019

(30) Foreign Application Priority Data

Jul. 19, 2017 (GB) .................................. 1711599.9

(51) Int. Cl.
| | |
|---|---|
| *G08G 5/02* | (2006.01) |
| *G01C 22/02* | (2006.01) |
| *G01S 17/89* | (2020.01) |
| *G01S 17/933* | (2020.01) |
| *G08G 5/00* | (2006.01) |
| *G05D 1/06* | (2006.01) |
| *G01C 23/00* | (2006.01) |

(52) U.S. Cl.
CPC ........... *G08G 5/025* (2013.01); *G01C 23/005* (2013.01); *G01S 17/89* (2013.01); *G01S 17/933* (2013.01); *G05D 1/0676* (2013.01); *G08G 5/0021* (2013.01); *G08G 5/0047* (2013.01)

(58) Field of Classification Search
CPC .... G08G 5/025; G08G 5/0021; G08G 5/0047; G05D 1/0676; G01S 17/933

USPC .......................................................... 701/16
See application file for complete search history.

(56) References Cited

U.S. PATENT DOCUMENTS

| | | | |
|---|---|---|---|
| 6,101,431 A | 8/2000 | Niwa et al. | |
| 6,154,693 A * | 11/2000 | Aberschitz | G01S 5/0054 |
| | | | 701/120 |
| 7,920,943 B2 | 4/2011 | Campbell et al. | |
| 7,948,403 B2 | 5/2011 | Hartman | |
| 8,493,412 B2 | 7/2013 | Suddreth et al. | |

(Continued)

OTHER PUBLICATIONS

European Search Report Corresponding EP18183399.7 dated Nov. 21, 2018.

(Continued)

*Primary Examiner* — Yazan A Soofi
(74) *Attorney, Agent, or Firm* — Dority & Manning, P.A.

(57) ABSTRACT

A landing system for controlling operation of an aerial vehicle flying a final approach to a runway includes a computing device and a LIDAR scanner. The device obtains a first data set indicative of a reference flight path for the final approach. The first data set includes a time-of-flight measurement for each light beam of a first plurality of light beams emitted prior to the aerial vehicle flying the final approach. The device determines an actual flight path for the final approach based, at least in part, on a second data set comprising a time-of-flight measurement for each light beam of a second plurality of light beams emitted from the light source of the LIDAR scanner. Based on the first and second data sets, the device determines the actual flight path deviates from the reference flight path and generates a control action to adjust operation of the aerial vehicle.

20 Claims, 9 Drawing Sheets

(56) References Cited

U.S. PATENT DOCUMENTS

| | | | |
|---|---|---|---|
| 8,521,343 B2 | 8/2013 | Spinelli | |
| 8,773,289 B2 | 7/2014 | Maggiore et al. | |
| 8,867,025 B1* | 10/2014 | Smalls | G08G 5/04 356/28 |
| 9,165,366 B2 | 10/2015 | Koukol et al. | |
| 9,830,828 B2* | 11/2017 | Nicholls | G01S 1/045 |
| 10,102,758 B1* | 10/2018 | Beaurepaire | G08G 5/0069 |
| 2004/0141170 A1* | 7/2004 | Jamieson | G01S 7/4811 356/5.01 |
| 2009/0306840 A1* | 12/2009 | Blenkhorn | G05D 1/0676 701/16 |
| 2011/0035080 A1* | 2/2011 | Murphy | B64D 45/04 701/9 |
| 2011/0285981 A1* | 11/2011 | Justice | G01S 7/4813 356/4.01 |
| 2013/0325213 A1* | 12/2013 | Mamidipudi | B64C 19/00 701/3 |
| 2015/0375871 A1 | 12/2015 | Canale et al. | |
| 2016/0264255 A1* | 9/2016 | Connor | H04N 5/247 |
| 2017/0283087 A1* | 10/2017 | McNeill | B64D 45/08 |

OTHER PUBLICATIONS

Great Britain Search Report Corresponding to GB1711599.9 dated Dec. 27, 2017.

Smithsonian, Nortronics NAS-14V2 Astroinertial Navigation System, Time and Navigation, 2 Pages. http://timeandnavigation.si.edu/multimedia-asset/nortronics-nas-14v2-astroinertial-navigation-system.

Wikipedia, Lockheed SR-71 Blackbird, 24 Pages. https://en.wikipedia.org/wiki/Lockheed_SR-71_Blackbird#Astro-inertial_navigation_system.

Wikipedia, Tercom, Terrain Contour Matching, 4 Pages. https://en.wikipedia.org/wiki/TERCOM.

* cited by examiner

LANDING SYSTEM FOR AN AERIAL VEHICLE

FIELD

The present subject matter relates generally to aerial vehicles. In particular, the present subject matter relates to a landing system for aerial vehicles.

BACKGROUND

A landing system used to guide an aerial vehicle onto a runway includes components on the ground as well as onboard the aerial vehicle. However, when the ground based components become inoperable (e.g., fail), aerial vehicles must be rerouted to another runway or, even worse, another airport. In addition, if an airport does not include ground based components, aerial vehicles must be rerouted to another airport. Rerouting the aerial vehicles is undesirable, because the additional travel time increases fuel consumption. In addition, the reputation of an airliner providing passenger services can be negatively impacted.

BRIEF DESCRIPTION

Aspects and advantages of the present disclosure will be set forth in part in the following description, or may be obvious from the description, or may be learned through practice of the present disclosure.

In an example embodiment, a landing system for controlling operation of an aerial vehicle flying a final approach to a runway can include a LIDAR scanner. The LIDAR scanner can be mounted to the aerial vehicle. In addition, the LIDAR scanner can include a light source configured to emit a light beam. The landing system can also include one or more computing device(s) configured to obtain a first data set indicative of a reference flight path for the final approach. The first data set can include a time-of-flight measurement for each light beam of a first plurality of light beams emitted prior to the aerial vehicle flying the final approach. In addition, the computing device(s) can be configured to determine an actual flight path for the final approach based, at least in part, on a second data set. The second data set can include a time-of-flight measurement for each light beam of a second plurality of light beams emitted from the light source of the LIDAR scanner when the aerial vehicle is flying the final approach. The computing device(s) can be further configured to determine whether the actual flight path deviates from the reference flight path based, at least in part, on the first data set and the second data set. When the actual fight path deviates from the reference flight path by a predetermined amount, the computing device(s) can be further configured to generate a control action to adjust operation of the aerial vehicle. More specifically, the computing device(s) can generate the control action until the actual flight path no longer deviates from the reference flight path by the predetermined amount.

In another example embodiment, a method for controlling operation of an aerial vehicle flying a final approach to a runway can include obtaining, by one or more computing device(s), a first data set indicative of a reference flight path for the final approach to the runway. The first data set can include a time-of-flight measurement for each light beam of a first plurality of light beams emitted prior to the aerial vehicle flying the final approach. The method can further include determining, by the computing device(s), an actual flight path for the final approach based, at least in part, on a second data set. The second data set can include a time-of-flight measurement for each light beam of a second plurality of light beams emitted from a light source of a LIDAR scanner mounted to the aerial vehicle. In addition, the second plurality of light beams can be emitted from the light source when the aerial vehicle is flying the final approach. The method can further include determining, by the computing device(s), whether the actual flight path deviates from the reference flight path based, at least in part, on the first data set and the second data set. When the actual fight path deviates from the reference flight path by a predetermined amount, the method can further include generating, by the computing device(s), a control action to adjust operation of the aerial vehicle. More specifically, the computing device(s) can generate the control action until the actual flight path no longer deviates from the reference flight path by the predetermined amount.

These and other features, aspects and advantages of the present disclosure will become better understood with reference to the following description and appended claims. The accompanying drawings, which are incorporated in and constitute a part of this specification, illustrate embodiments of the present disclosure and, together with the description, serve to explain the principles of the present disclosure.

BRIEF DESCRIPTION OF THE DRAWINGS

A full and enabling disclosure of the present disclosure, including the best mode thereof, directed to one of ordinary skill in the art, is set forth in the specification, which makes reference to the appended Figs., in which.

DETAILED DESCRIPTION

Figure 1:
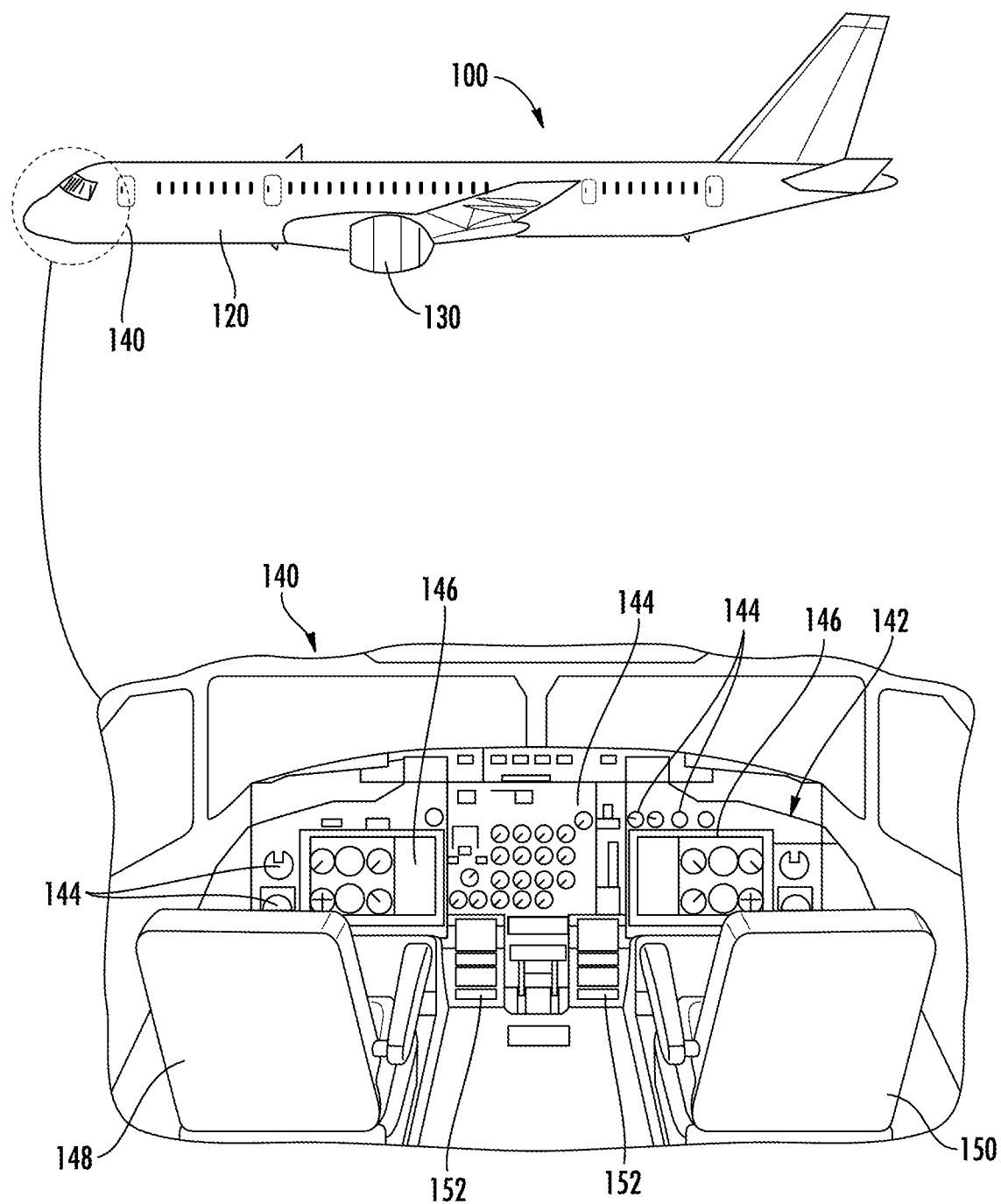
FIG. 1 illustrates an aerial vehicle according to example embodiments of the present disclosure.

Reference will now be made in detail to present embodiments of the present disclosure, one or more examples of which are illustrated in the accompanying drawings. The detailed description uses numerical and letter designations to refer to features in the drawings.

As used herein, the terms "first" and "second" can be used interchangeably to distinguish one component from another and are not intended to signify location or importance of the individual components. The singular forms "a", "an", and "the" include plural references unless the context clearly dictates otherwise.

Example embodiments of the present disclosure are directed to a landing system for an aerial vehicle and a related method of using the landing system. Specifically, in example embodiments, the landing system can include a LIDAR scanner mounted to an aerial vehicle. The LIDAR scanner can include a light source and a sensor. The light source can emit a light beam that can be reflected off a surface and collected by the sensor. In example embodiments, the surface can be a ground surface and/or ground objects (e.g., buildings, mountains, a body of water etc.) positioned beneath a flight path executed by the aerial vehicle. However, since the light beam cannot be emitted beyond a predefined depth of the body of water, it should be appreciated that ground objects only includes bodies of water whose floor is less than or equal to the predefined depth.

The landing system can include one or more computing device(s). The computing device(s) can control operation of the aerial vehicle during a particular phase of a flight path executed by the aerial vehicle. In example embodiments, the particular phase can include a final approach to a runway. In order to control operation of the aerial vehicle on the final approach, the computing device(s) can obtain a first data set indicative of a reference flight path for the final approach. The first data set can include a time-of-flight measurement for each light beam of a first plurality of light beams emitted prior to the aerial vehicle flying the final approach to the runway. In example embodiments, the first plurality of light beams can be emitted from a light source of a LIDAR scanner mounted to second aerial vehicle (e.g., satellite) having previously flown the flight path for the runway.

In addition, the computing device(s) can determine an actual flight path of the aerial vehicle currently flying the final approach to the runway. The actual flight path can be based, at least in part, on a second data set comprising a time-of-flight measurement for each light beam of a second plurality of light beams emitted from a light source of the LIDAR scanner mounted to the aerial vehicle. The computing device(s) can compare the second data set against the first data set. If one or more time-of-flight measurements included in the second data set deviate from corresponding time-of-flight measurements included in the first data set, then the computing device(s) can determine the actual flight path deviates from the reference flight path.

When the computing device(s) determine the actual flight path deviates from the reference flight path, the computing device(s) can generate a control action to adjust operation of the aerial vehicle. In example embodiments, the computing device(s) can generate subsequent control actions until the actual flight path matches the reference flight path. Also, the control actions can vary depending on how the actual flight path deviates from the reference flight path. For example, if the actual flight path is at a greater altitude than the reference flight path, the control action can cause the aerial vehicle to descend until an altitude coordinate of the actual flight path matches an altitude coordinate of the reference flight path.

The systems and methods described herein can provide a number of technical effects and benefits. For instance, the landing system can be used when environmental conditions (e.g., fog, clouds) degrade visibility of the runway, because operation of the LIDAR scanner is unaffected by the environmental conditions. In addition, the aerial vehicle can land at a greater number of airports, because the landing system does not require ground based components. In this way, the landing system of the present disclosure provides cost savings to an airliner owning a fleet of aerial vehicles, because the likelihood of one or more aerial vehicles being rerouted due to environmental conditions or failure of ground based equipment is eliminated.

FIG. 1 depicts an aerial vehicle 100 according to example embodiments of the present disclosure. As shown, the aerial vehicle 100 can include a fuselage 120, one or more engine(s) 130, and a cockpit 140. In example embodiments, the cockpit 140 can include a flight deck 142 having various instruments 144 and flight displays 146. It should be appreciated that instruments 144 can include, without limitation, a dial, gauge, or any other suitable analog device.

A first user (e.g., a pilot) can be present in a seat 148 and a second user (e.g., a co-pilot) can be present in a seat 150. The flight deck 142 can be located in front of the pilot and co-pilot and may provide the flight crew (e.g., pilot and co-pilot) with information to aid in operating the aerial vehicle 100. The flight displays 146 can include primary flight displays (PFDs), multi-purpose control display units (MCDUs), navigation display (ND), or any suitable combination. During operation of the aerial vehicle 100, both the instruments 144 and flight displays 146 can display a wide range of vehicle, flight, navigation, and other information used in the operation and control of the aerial vehicle 100.

The instruments 144 and flight displays 146 may be laid out in any manner including having fewer or more instruments or displays. Further, the flight displays 146 need not be coplanar and need not be the same size. A touch screen display or touch screen surface (not shown) may be included in the flight displays 146 and may be used by one or more flight crew members, including the pilot and co-pilot, to interact with the aerial vehicle 100. The touch screen surface may take any suitable form including that of a liquid crystal display (LCD) and may use various physical or electrical attributes to sense inputs from the flight crew. It is contemplated that the flight displays 146 can be dynamic and that one or more cursor control devices (not shown) and/or one or more multifunction keyboards 152 can be included in the cockpit 140 and may be used by one or more flight crew members to interact with systems of the aerial vehicle 100. In this manner, the flight deck 142 may be considered a user interface between the flight crew and the aerial vehicle 100.

Additionally, the cockpit 140 can include an operator manipulated input device 160 that allow members of the flight crew to control operation of the aerial vehicle 100. In one example embodiment, the operator manipulated input device 160 can be used to control the engine power of the one or more engines 130. More specifically, the operator manipulated input device 160 can include a lever having a handle, and the lever can be movable between a first position and a second position. As such, a flight crew member can move the lever between the first and second positions to control the engine power of the one or more engine(s) 130. It should be appreciated that the pilot can move the lever to one of a plurality of intermediate third positions disposed between the first position and the second position.

The numbers, locations, and/or orientations of the components of example aerial vehicle 100 are for purposes of illustration and discussion and are not intended to be limiting. As such, those of ordinary skill in the art, using the disclosures provided herein, shall understand that the numbers, locations, and/or orientations of the components of the aerial vehicle 100 can be adjusted without deviating from the scope of the present disclosure.

Figure 2:
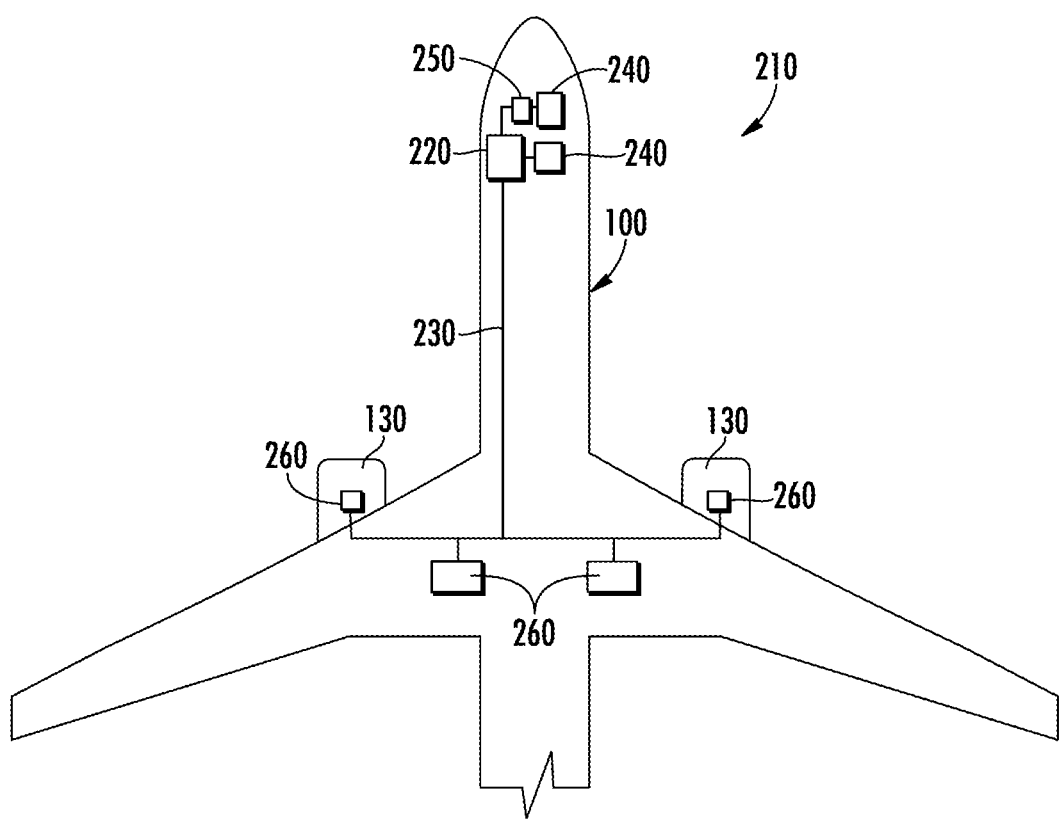
FIG. 2 illustrates a computing system for an aerial vehicle according to example embodiments of the present disclosure.

Referring now to FIG. 2, the aerial vehicle 100 can include an onboard computing system 210. As shown, the onboard computing system 210 can include one or more onboard computing device(s) 220 that can be associated with, for instance, an avionics system. In example embodiments, one or more of the onboard computing device(s) 220 can include a flight management system (FMS). Alternatively or additionally, the one or more onboard computing device(s) 220 can be coupled to a variety of systems on the aerial vehicle 100 over a communication network 230. The communication network 230 can include a data bus or combination of wired and/or wireless communication links.

In example embodiments, the onboard computing device(s) 220 can be in communication with a display system 240, such as the flight displays 146 (FIG. 1) of the aerial vehicle 100. More specifically, the display system 240 can include one or more display device(s) configured to display or otherwise provide information generated or received by the onboard computing system 210. In example embodiments, information generated or received by the onboard computing system 210 can be displayed on the one or more display device(s) for viewing by flight crew members of the aerial vehicle 102. The display system 240 can include a primary flight display, a multipurpose control display unit, or other suitable flight displays 146 commonly included within the cockpit 140 (FIG. 1) of the aerial vehicle 100.

The onboard computing device(s) 220 can also be in communication with a flight management computer 250. In example embodiments, the flight management computer 250 can automate the tasks of piloting and tracking the flight plan of the aerial vehicle 100. It should be appreciated that the flight management computer 250 can include or be associated with any suitable number of individual microprocessors, power supplies, storage devices, interface cards, auto flight systems, flight management computers, the flight management system (FMS) and other standard components. The flight management computer 250 can include or cooperate with any number of software programs (e.g., flight management programs) or instructions designed to carry out the various methods, process tasks, calculations, and control/display functions necessary for operation of the aerial vehicle 100. The flight management computer 250 is illustrated as being separate from the onboard computing device(s) 220. However, those of ordinary skill in the art, using the disclosures provided herein, will understand that the flight management computer 250 can also be included with or implemented by the onboard computing device(s) 220.

The onboard computing device(s) 220 can also be in communication with one or more aerial vehicle control system(s) 260. The aerial vehicle control system(s) 260 can be configured to perform various aerial vehicle operations and control various settings and parameters associated with the aerial vehicle 100. For instance, the aerial vehicle control system(s) 260 can be associated with one or more engine(s) 130 and/or other components of the aerial vehicle 100. The aerial vehicle control system(s) 260 can include, for instance, digital control systems, throttle systems, inertial reference systems, flight instrument systems, engine control systems, auxiliary power systems, fuel monitoring systems, engine vibration monitoring systems, communications systems, flap control systems, flight data acquisition systems, a flight management system (FMS), a landing system and other systems.

Figure 3:
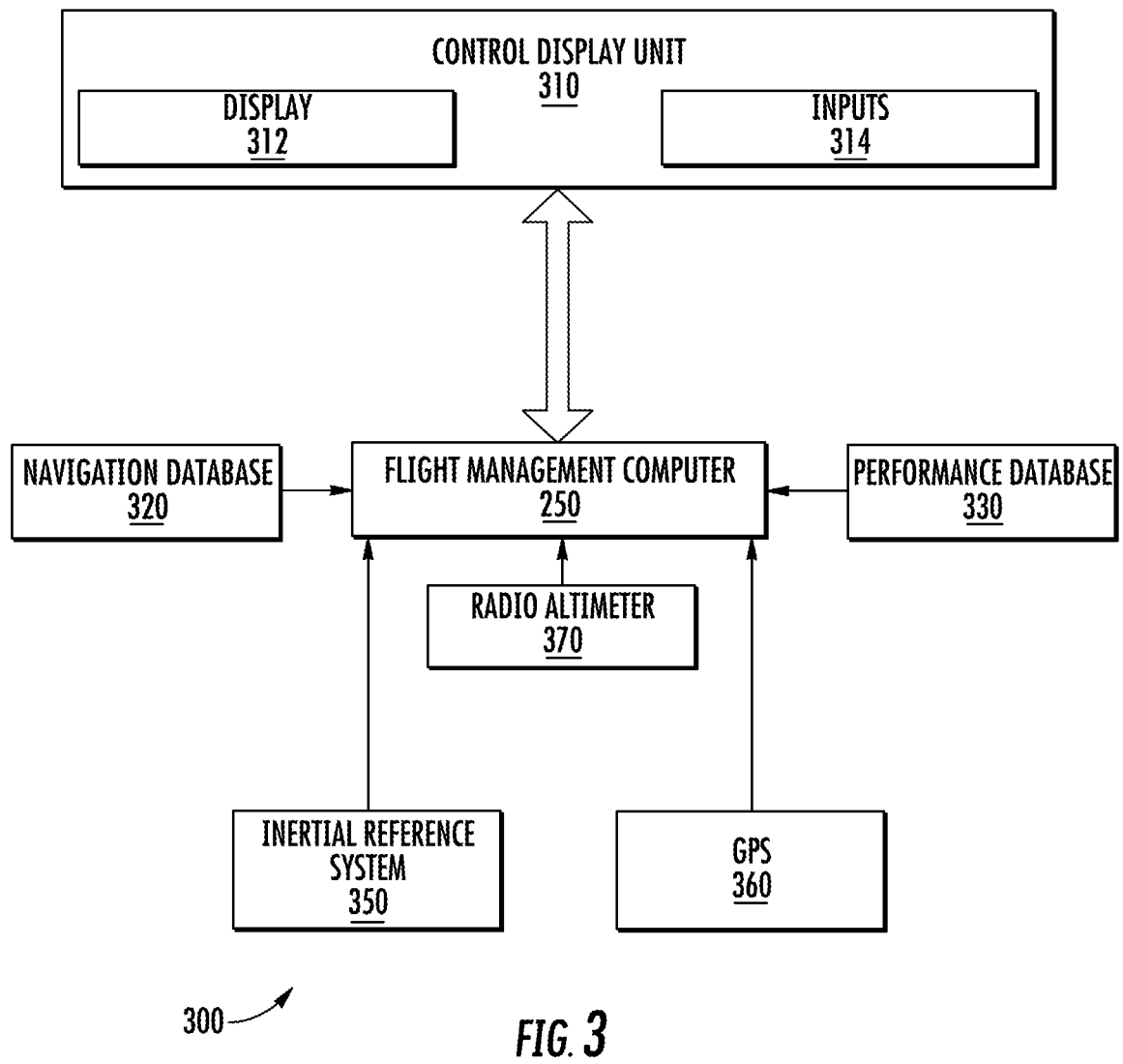
FIG. 3 illustrates an flight management system for an aerial vehicle according to example embodiments of the present disclosure.

FIG. 3 depicts a FMS 300 according to example embodiments of the present disclosure. As shown, the FMS 300 can include a control display unit (CDU) 310 having a display 312 and one or more input devices 314 (e.g., keyboard). In example embodiments, the CDU 310 can be communicatively coupled to the flight control computer 250. In this way, flight crew members can communicate information to the flight control computer 250 through manipulation of the one or more input devices 314. Likewise, the flight management computer 250 can present information to the flight crew via the display 312 of the CDU 310.

In example embodiments, the FMS 300 can include a navigation database 320 communicatively coupled to the flight management computer 250. The navigation database 320 can include information from which a flight path for the aerial vehicle 100 can be generated. In example embodiments, information stored in the navigation database 320 can include, without limitation, airways and associated waypoints. In particular, an airway can be a predefined path that connects one specified location (e.g., departing airport) to another location (e.g., destination airport). In addition, a waypoint can include one or more intermediate point(s) or place(s) on the predefined path defining the airway.

The FMS 300 can also include a performance database 330 that is communicatively coupled to the flight management computer 250. The performance database 330 can include information that, in combination with information from the navigation database 320, can be used to generate a flight path for the aerial vehicle 100. In example embodiments, the performance database 330 can include, without limitation, a performance model that can be used to optimize the flight path. More specifically, the performance model can include, without limitation, data indicative of fuel consumption and aerodynamic drag. It should be appreciated that the data can be a function of any suitable value. In one example embodiment, the data can be a function of altitude. Alternatively or additionally, the data can be a function of airspeed of the aerial vehicle 100. Still further, the data can be a function of atmospheric conditions of an environment in which the aerial vehicle 100 is operating.

Still referring to FIG. 3, the FMS 300 can also include an inertial reference system (IRS) 350 that is communicatively coupled to the flight management computer 250. The IRS 350 can be configured to determine a position, velocity and/or acceleration of the aerial vehicle 100. In example embodiments, the IRS 350 can include a gyroscope, an accelerometer, or both to determine a position, velocity and/or acceleration of the aerial vehicle 100. In addition, the FMS 300 can include a global positioning system (GPS) 360 that is communicatively coupled to the flight management computer 250. The GPS 360 can be configured to determine a position of the aerial vehicle 100. Alternatively or additionally, the FMS 300 can include a radio altimeter 370 configured to determine an altitude of the aerial vehicle 100.

Figure 4:
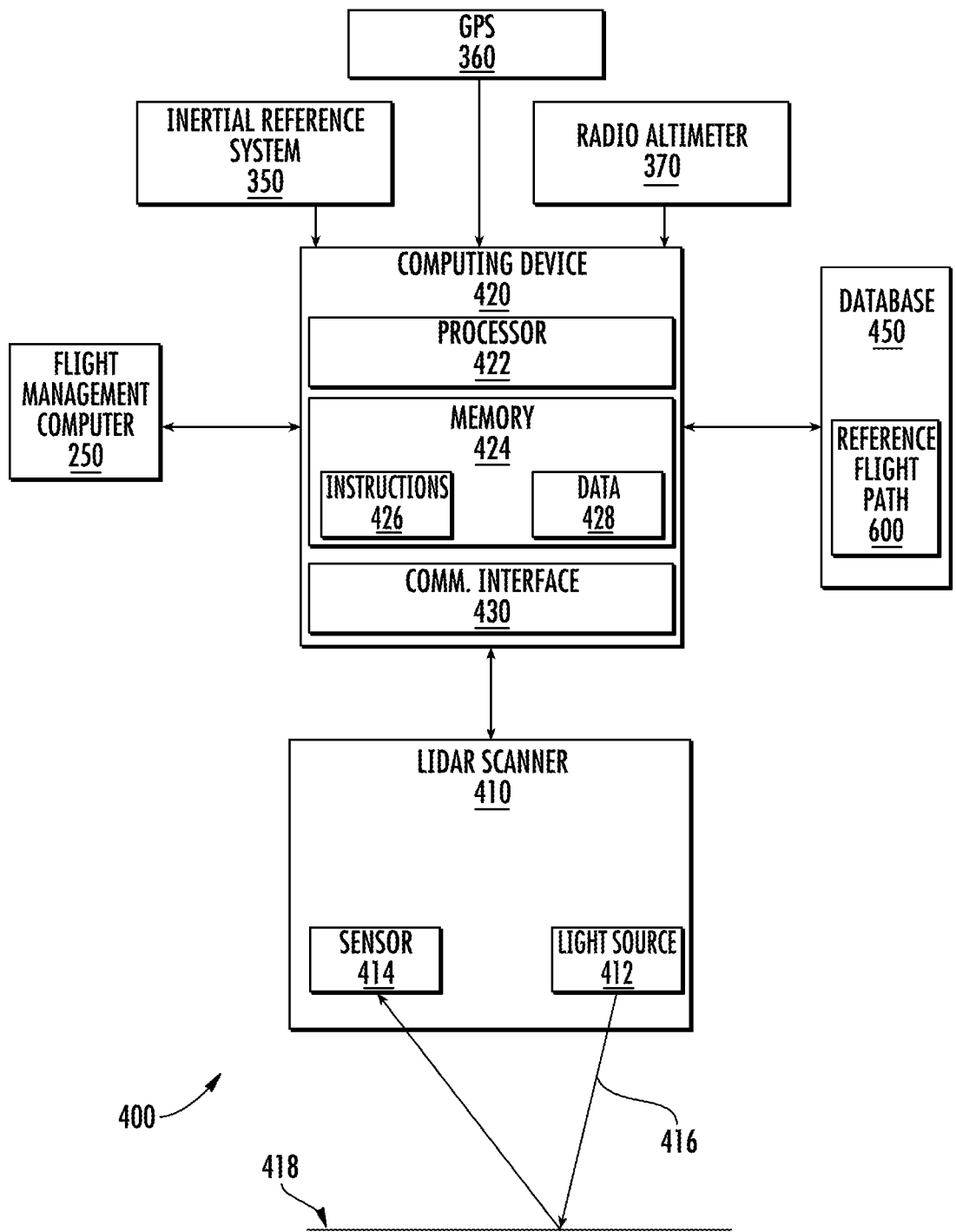
FIG. 4 illustrates a landing system for an aerial vehicle according to example embodiments of the present disclosure.

FIG. 4 depicts an example embodiment of a landing system 400 for the aerial vehicle 100. As shown, the landing system 400 can include a LIDAR scanner 410 comprising a light source 412 and a sensor 414. The light source 412 can be configured to emit a light beam 416. In example embodiments, the light source 412 can emit the light beam 416 onto a surface 418 and, as shown, the light beam 416 can be reflected off the surface 418 and collected by the sensor 414. As will be discussed below in more detail, a distance between the LIDAR scanner 410 and the surface 418 can be determined based, at least in part, on a time-of-flight of the light beam 416.

In example embodiments, the landing system 400 can include one or more computing devices 420 configured to determine the time-of-flight of the light beam 416. The one or more computing device(s) 420 can include one or more processor(s) 422 and one or more memory device(s) 424.

The one or more processor(s) 422 can include any suitable processing device, such as a microprocessor, microcontroller, integrated circuit, logic device, or other suitable processing device. The one or more memory device(s) 424 can include one or more computer-readable media, including, but not limited to, non-transitory computer-readable media, RAM, ROM, hard drives, flash drives, or other memory devices.

The one or more memory device(s) 424 can store information accessible by the one or more processor(s) 422, including computer-readable instructions 426 that can be executed by the one or more processor(s) 422. The computer-readable instructions 426 can be any set of instructions that when executed by the one or more processor(s) 422, cause the one or more processor(s) 422 to perform operations. The computer-readable instructions 426 can be software written in any suitable programming language or can be implemented in hardware. In some embodiments, the computer-readable instructions 426 can be executed by the one or more processor(s) 422 to cause the one or more processor(s) 422 to perform operations, such as controlling operation of an aerial vehicle, as described below with reference to FIG. 9.

The memory device(s) 424 can further store data 428 that can be accessed by the one or more processor(s) 422. For example, the data 428 can include one or more table(s), function(s), algorithm(s), model(s), equation(s), etc. according to example embodiments of the present disclosure.

The one or more computing device(s) 420 can also include a communication interface 430 used to communicate, for example, with the other components of system. The communication interface 430 can include any suitable components for interfacing with one or more network(s), including for example, transmitters, receivers, ports, controllers, antennas, or other suitable components. As will be discussed below in more detail, the computing device(s) can be in communication with the flight management computer 250 (FIG. 3).

Figure 5:
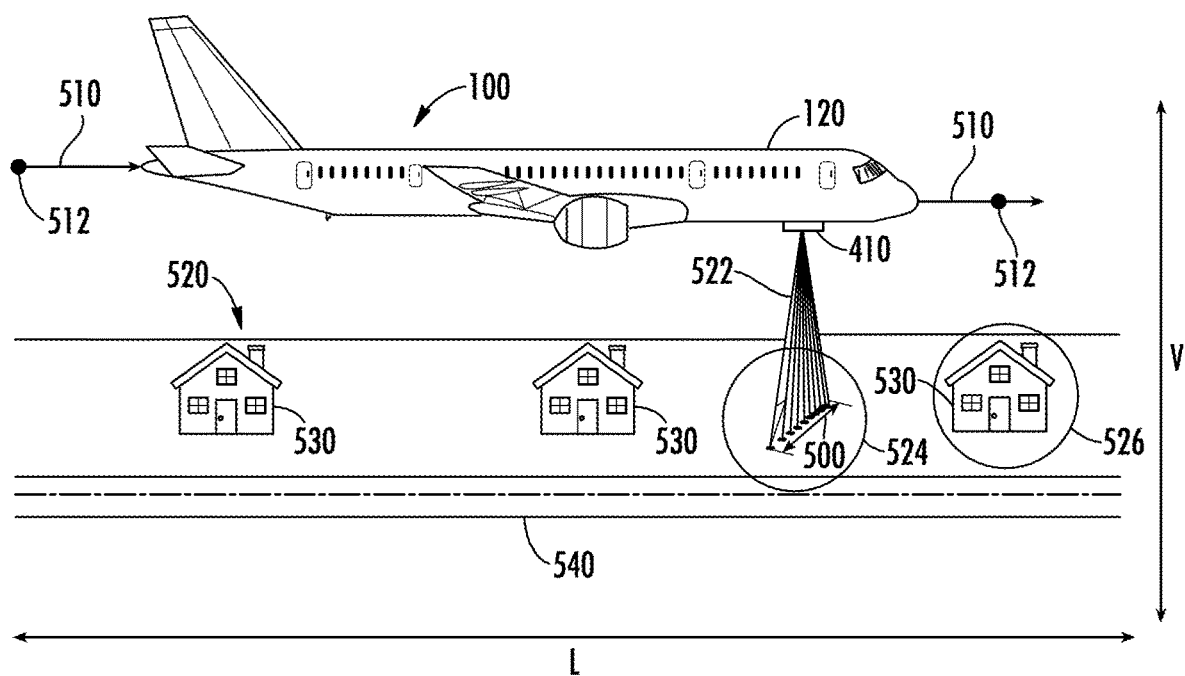
FIG. 5 illustrates the landing system of FIG. 4 mounted to an aerial vehicle according to example embodiments of the present disclosure.

Referring now to FIGS. 4 and 5, the LIDAR scanner 410 can be removably mounted to the aerial vehicle 100. In alternative embodiments, however, the LIDAR scanner 410 can be integral with the aerial vehicle 100. More specifically, the LIDAR scanner 410 can be removably mounted to an exterior surface of the fuselage 120. In example embodiments, the LIDAR scanner 410 can be removably mounted to a gimbal mounted to the exterior surface of the fuselage 120. In addition, the gimbal can be rotatable along one or more axes. In this way, a position of the LIDAR scanner 410 can be adjusted based, at least in part, on the orientation of the aerial vehicle 100. More specifically, the position of the LIDAR scanner 410 can be adjusted so that the LIDAR scanner 410 is substantially perpendicular to the surface 418. As will be discussed below in more detail, the LIDAR scanner 410 can define a scan path 500 along one or more axes.

As shown, a flight path 510 for the aerial vehicle 100 operating in an environment (e.g., airway) is depicted according to example embodiments of the present disclosure. The flight path 510 can include a plurality of waypoints 512 to define the flight path 510. It should be appreciated that the flight path 510 can be generated by the FMS 300 discussed above with reference to FIG. 3. In particular, the flight management computer 250 can generate the flight path 510 based, at least in part, on information received from the control display unit 310, the navigation database 320, the performance database 330, the inertial reference system 350, or any suitable combination thereof.

In example embodiments, the flight path 510 can be a four-dimensional trajectory comprising a spatial component and a temporal component. The spatial component can indicate a position of the aerial vehicle 100 within a three-dimensional coordinate system. More specifically, the three-dimensional coordinate system can include a latitude axis L, a longitude axis (not shown) and a vertical axis V. The latitude and longitude axes can indicate a position of the aerial vehicle 100 on a sphere or ellipsoid representative of Earth. The vertical axis V can indicate a distance between the aerial vehicle 100 and a surface of the sphere (e.g., Earth). In addition, the temporal component of the four-dimensional trajectory can indicate when the aerial vehicle 100 can be expected to cross each of the waypoints 512

In example embodiments, the LIDAR scanner 410 can be used to generate a three-dimensional (3D) model of a ground surface 520 positioned beneath the flight path 510 of the aerial vehicle 100. In particular, the LIDAR scanner 410 can scan the ground surface 520 by emitting a plurality of light beams 522 onto a portion 524 of the ground surface 520 that is within the scan path 500. Each light beam of the plurality of light beams 522 can be reflected off the portion 524 of the ground surface 520 and can be collected by the sensor 414. As discussed above, the computing device(s) 420 can determine a time-of-flight measurement for each light beam of the plurality of light beams 522. In this way, the computing device(s) 420 can determine a distance between the LIDAR scanner 410 and the portion 524 of the ground surface 520. In particular, the distance can be measured along the vertical axis V.

As the aerial vehicle 100 moves along the flight path 510, the LIDAR scanner 410 can scan different portions of the ground surface 520. For example, the LIDAR scanner 410 can scan a portion 526 of the ground surface 520 that includes a ground object. As shown, the ground object can be a building 530. In alternative embodiments, however, the ground object can be a road 540. In still other alternative embodiments, the ground object can be any suitable natural phenomena, such as a mountain, a forest, or a body of water (e.g., river, lake, etc.).

In example embodiments, the computing device(s) 420 can be communicatively coupled to the inertial reference system 350 and the GPS 360. Alternatively or additionally, the computing device(s) 420 can be communicatively coupled to the radio altimeter 370. In this way, the computing device(s) 420 can assign a location identifier to the time-of-flight measurement determined for each light beam of the plurality of light beams 522 emitted from the light source 412. The location identifier can indicate a position of the aerial vehicle 100 relative to the ground surface 520 or, alternatively, a ground object. More specifically, the location identifier can include a latitude coordinate, a longitude coordinate and an altitude coordinate. In example embodiments, the computing device(s) 420 can transmit the position of the aerial vehicle 100 to the flight management computer 250. More specifically, the flight management computer 250 can use the received position to control operation of the aerial vehicle 100. In addition, the received position can be displayed on one of the flight displays 146 (FIG. 1) included in the cockpit 140 of the aerial vehicle 100.

The computing device(s) 420 can be further configured to generate the 3D model of the ground surface 520, including ground objects (e.g., building, road, etc.), positioned beneath the flight path 510 of the aerial vehicle 100. As will be discussed below in more detail, the landing system 400 of FIG. 4 can be used to generate a 3D model of a ground surface and one or more ground object(s) that are positioned beneath the aerial vehicle during select phases (e.g., cruise, final approach) of a flight path.

Figure 6:
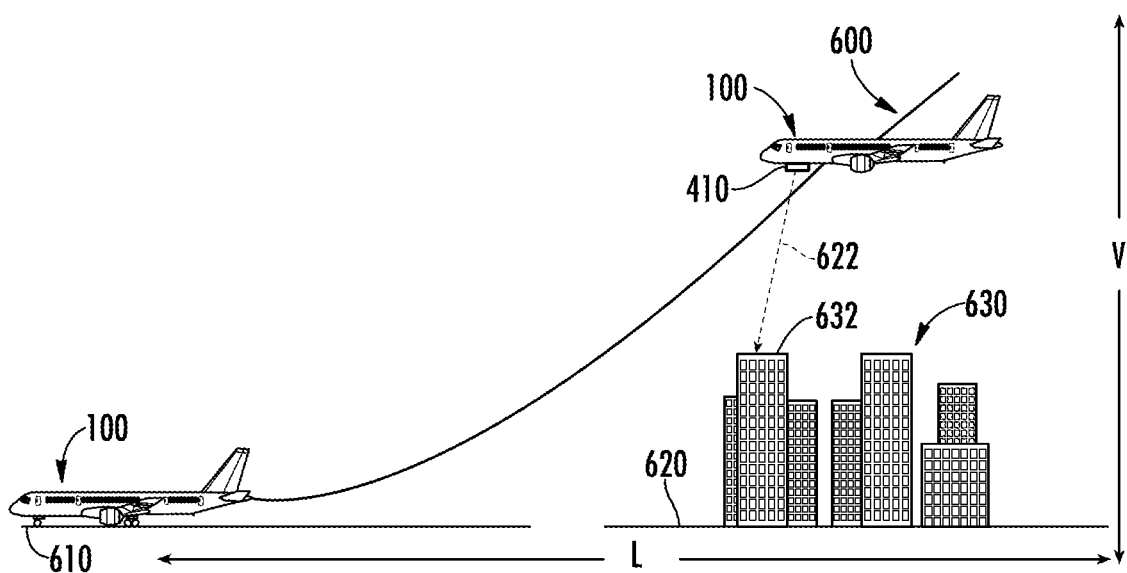
FIG. 6 illustrates an aerial vehicle flying a final approach to a runway according to example embodiments of the present disclosure.

FIG. 6 depicts a reference flight path 600 flown by the aerial vehicle 100 during a final approach to a runway 610. As shown, the aerial vehicle 100 files over a ground surface 620 and one or more ground objects during the final approach to the runway 610. In example embodiments, a LIDAR scanner 410 mounted to the aerial vehicle 100 can be used to collect a first data set that can be used to generate a 3D model of the ground surface 620 and the ground object(s). In alternative embodiments, however, the first data set can be collected from a LIDAR scanner mounted to a second aerial vehicle. More specifically, the second aerial vehicle can include a satellite orbiting the Earth.

As shown, the light source 412 of the LIDAR scanner 410 can emit a first plurality of light beams 622 (only one shown) as the aerial vehicle 100 files the final approach to the runway 610. More specifically, each light beam of the first plurality of light beams 622 can reflect off the ground surface 620 or, alternatively, a ground object, such as a building 630 positioned along the final approach. As the aerial vehicle 100 files over the building 630, the light beam 622 emitted by the light source 412 (FIG. 4) can reflect off of a top 632 of the building 630 and can be collected by the sensor 414 (FIG. 4) of the LIDAR scanner 410. In this way, the computing device(s) 420 can determine a time-of-flight measurement for the light beam 622. The first data set can include the time-of-flight measurement, which can indicate a distance between the LIDAR scanner 410 and the top 632 of the building 630. In addition, the first data set can also include a time-of-flight measurement for one or more light beams emitted before and after the light beam 622 depicted in FIG. 6. In this way, the computing device(s) 420 can determine a height H of the building 630 based, at least in part, on the first data set.

In example embodiments, each time-of-flight measurement included in the first data set can be assigned a location identifier. More specifically, the location identifier can be assigned based, at least in part, on data from the inertial reference system 350, the GPS 360, the radio altimeter 370, or any suitable combination thereof. In example embodiments, the first data set (e.g., location identifier and time-of-flight measurements) can be used to generate the 3D model of the ground surface 620 and ground objects (e.g., building 630). In particular, a location identifier assigned to the time-of-flight measurement for the light beam 622 that reflects off the top 632 of the building 630 can be used to determine a position of the building 630 within the 3D model.

In addition, the first data set can indicate a position of the aerial vehicle 100 relative to the ground surface 620 and the building 630. More specifically, the location identifier and time-of-flight measurements can indicate the position of the aerial vehicle 100 relative to the ground surface 620 and the building 630. In this way, the location identifier and time-of-flight measurements can indicate a flight path (e.g., the reference flight path 600) the aerial vehicle 100 flew during the final approach to the runway 610. As will be discussed below in more detail, the 3D model, specifically the first data set, can be relied upon during one or more subsequent flights in which the aerial vehicle 100 lands at the runway 610.

In example embodiments, the landing system 400 can include a database 450 configured to store a plurality of 3D models generated for various final approaches to runways. More specifically, the database 450 can store the first data set used to generate the 3D model and determine the reference flight path 600 for the final approach to the runway 610. Alternatively or additionally, the database 450 can store 3D models generated for other phases (e.g., takeoff, climb, cruise, etc.) of a flight path. The 3D models stored in the database 450 can be uploaded to the navigation database 320 of one or more aerial vehicle at predefined intervals. For example, the 3D models can be uploaded to the navigation database 320 every twenty-eight days. In alternative embodiments, however, the 3D models can be uploaded more or less frequently.

Figure 7:
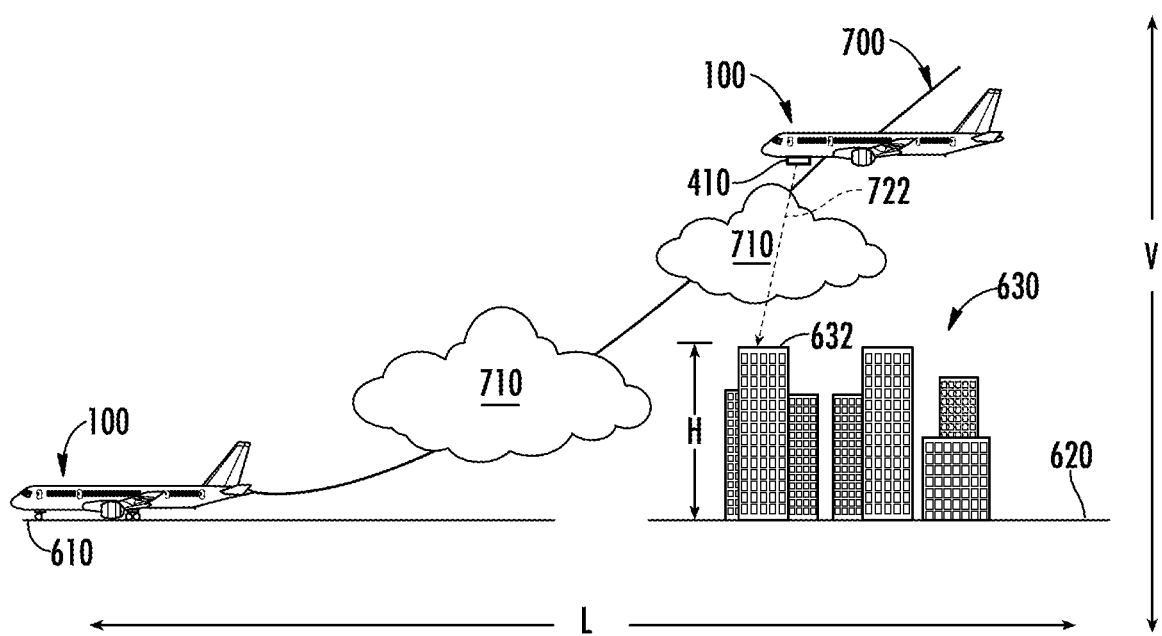
FIG. 7 illustrates an aerial vehicle flying the final approach of FIG. 6 during a low visibility event according to example embodiments of the present disclosure.

FIG. 7 depicts an actual flight path 700 for the final approach to the runway 610 when visibility is degraded due to an environmental condition. More specifically, the environmental condition can be one or more clouds 710 obstructing a view of the ground surface 620 and ground objects, such as the plurality of buildings 630. As the aerial vehicle 100 files the final approach to the runway 610, a second data set can be collected, in real-time or near real-time, and can be used to generate a 3D model of the ground surface 620 and ground objects, such as the building 630. In addition, the second data set can be used to determine a position of the aerial vehicle 100 relative to the ground surface and ground object(s).

As the aerial vehicle 100 flies over the building 630, a light beam 722 of a second plurality of light beams can be emitted by the light source 412 (FIG. 4), reflect off of a top 632 of the building 630, and be collected by the sensor 414 (FIG. 4) of the LIDAR scanner 410. In this way, the computing device(s) 420 can determine, in real-time or near real-time, a time-of-flight measurement for the light beam 722 of the second plurality of light beams. The time-of-flight measurement can indicate a distance between the LIDAR scanner 410 and the top 632 of the building 630. In example embodiments, the second data set can include time-of-flight measurement for the light beam 722. In addition, the second data set can include a time-of-flight measurement for one or more light beams emitted before and after the light beam 722 depicted in FIG. 7. In this way, the computing device(s) 420 can determine a height H of the building 630 based, at least in part, on the second data set.

In example embodiments, each time-of-flight measurement included in the second data set can be assigned a location identifier based, at least in part, on data from the inertial reference system 350, the GPS 360, the radio altimeter 370, or any combination thereof. More specifically, the location identifier can be assigned to each time-of-flight measurement in real-time or near real-time. In this way, the computing device(s) 420 can use the second data set (that is, the location identifier and time-of-flight measurement) to generate, in real-time or near real-time, a 3D model of the ground surface 620 and ground object(s) positioned beneath the aerial vehicle 100. The computing device(s) 420 can also use the second data set to determine, in real-time or near real-time, a position of the aerial vehicle 100 relative to the ground surface 620 and ground object(s). In this way, the second data set can be used to determine the actual flight path 700 of the aerial vehicle 100.

In addition, the computing device(s) 420 can be configured to compare the actual flight path 700 against the reference flight path 600 in real-time or near real-time. In example embodiments, the computing device(s) 420 can compare the second data set indicative of the actual flight path 700 against the first data set indicative of the reference flight path 600. More specifically, a first time-of-flight measurement included in the first data set can be compared against a second time-of-flight measurement included in the second data set. It should be appreciated that the location identifier assigned to the first time-of-flight measurement matches the location identifier assigned to the second time-of-flight measurement. If the second time-of-flight measurement deviates from the first time-of-flight measurement by the predetermined amount, then the computing device(s) 420 can generate a control action to adjust operation of the aerial vehicle 100. Furthermore, if time-of-flight measurements included in the second data set continue to deviate from time-of-flight measurements included in the first data set, then the computing device(s) 420 can be configured to generate additional control actions.

Figure 8:
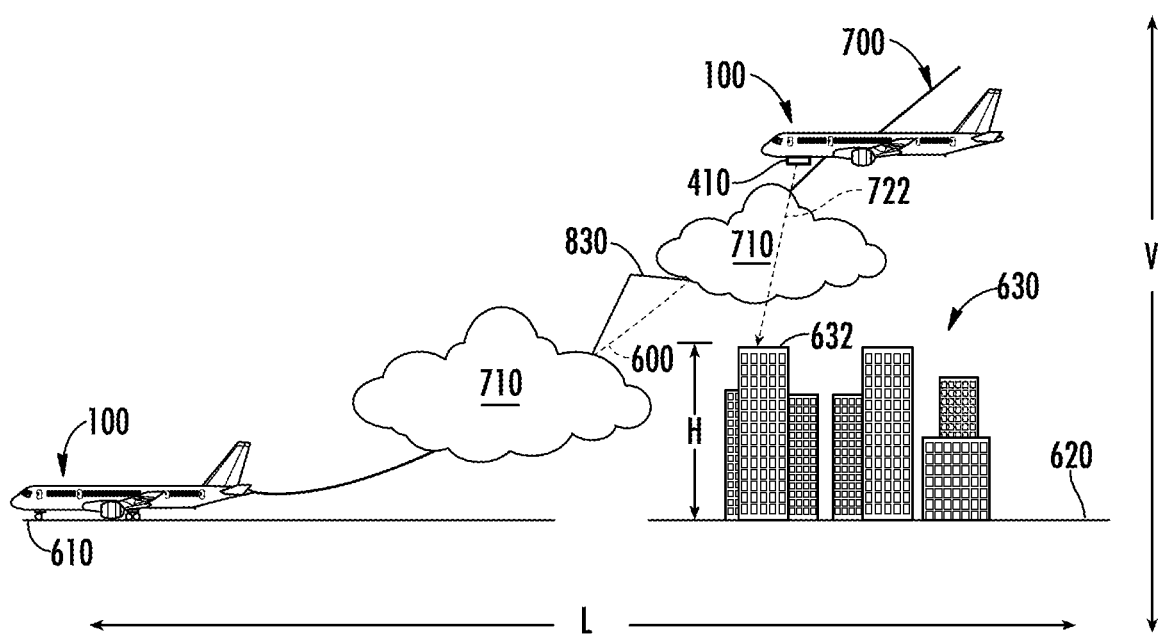
FIG. 8 illustrates an aerial vehicle deviating from the final approach of FIG. 6 during a low visibility event according to example embodiments of the present disclosure.

As mentioned above and depicted in FIG. 8, the computing device(s) 420 can be configured to generate the control action when a portion 830 of the actual flight path 700 deviates from the reference flight path 600 by a predetermined amount. In example embodiments, the predetermined amount can be a distance measured along the vertical direction V. Furthermore, if the actual flight path 700 continues to deviate from the reference flight path 600, the computing device(s) 420 can be configured to generate additional control actions. It should be appreciated, however, that each successive control action can have a different effect on how the aerial vehicle 100 operates. For example, one control action can cause the aerial vehicle 100 to climb, while another control action can cause the aerial vehicle 100 to descend.

In example embodiments, the reference flight path 600 for the final approach to the runway 610 can be updated each time the aerial vehicle 100 flies the final approach to runway 610. More specifically, the reference flight path 600 can be modified to reflect changes to the ground surface 620 and/or ground objects (e.g., building 630) that occur over a period of time (e.g., days, weeks, months, years). For example, the building 630 can be remodeled to include additional stories, which can increase the height H of the building 630. Conversely, natural (e.g., hurricane, tornado, etc.) or artificial (e.g., demolished) causes can destroy the building 630. It should be appreciated that either instance can impact accuracy of the reference flight path 600. As such, the computing device(s) 420 can be configured to store the actual flight path 700 in memory device(s) 424 and subsequently transmit the actual flight path 700, specifically the second data set, to the database 450. In this way, the reference flight path 600 can be updated to reflect changes to the ground surface 620 and ground objects.

Figure 9:
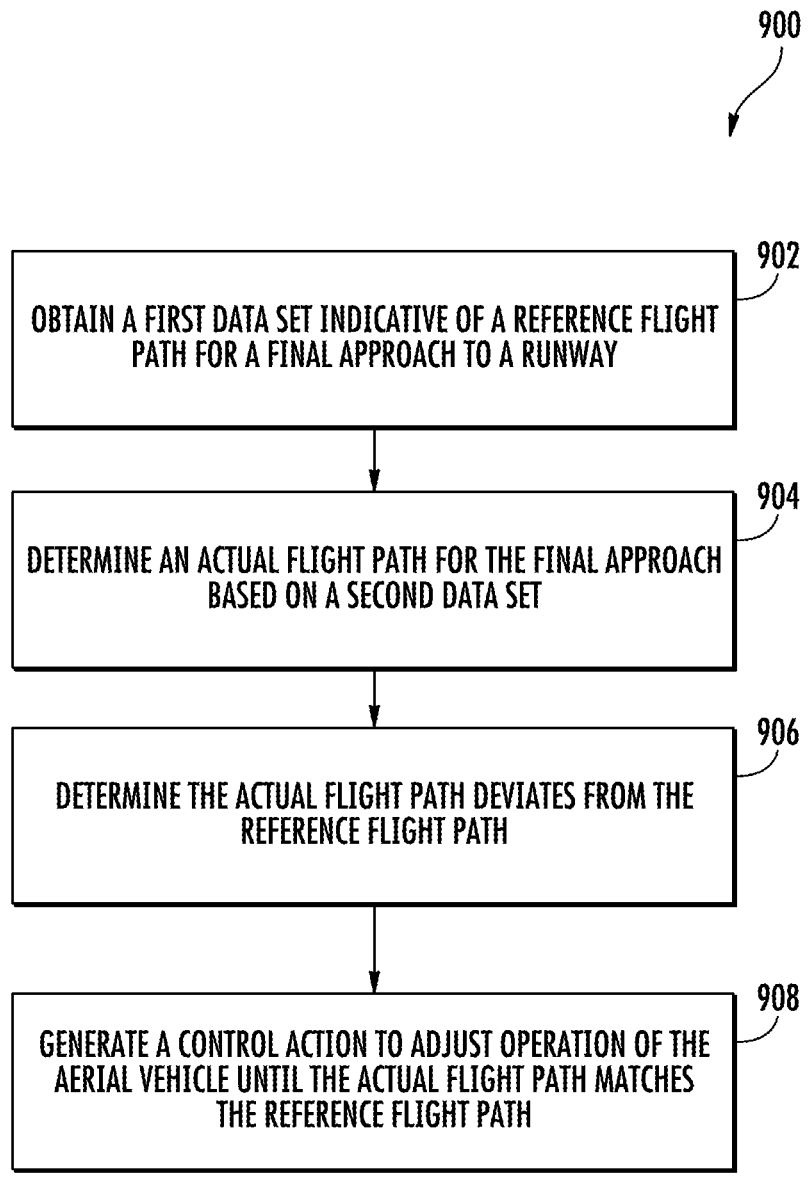
FIG. 9 illustrates a flow diagram of an example method for controlling operation of an aerial vehicle flying a final approach to a runway.

FIG. 9 depicts a flow diagram of an example method 900 for controlling operation of an aerial vehicle on a final approach to a runway. The method 900 can be implemented using, for instance, the system 400 of FIG. 4. FIG. 9 depicts steps performed in a particular order for purposes of illustration and discussion. Those of ordinary skill in the art, using the disclosures provided herein, will understand that various steps of any of the methods disclosed herein can be adapted, modified, rearranged, performed simultaneously or modified in various ways without deviating from the scope of the present disclosure.

At (902), the method 900 can include obtaining, by one or more computing devices, a first data set indicative of a reference flight path for the final approach to the runway. Specifically, in example embodiments, the first data set can include a time-of-flight measurement for each light beam of a first plurality of light beams emitted prior to the aerial vehicle flying the final approach. In example embodiments, the first data set can be obtained from a database configured to store reference flight paths for a plurality of final approaches. In addition, the first plurality of light beams can be emitted from a light source of a LIDAR scanner onboard a second aerial vehicle. In example embodiments, the second aerial vehicle can be a satellite orbiting Earth. Alternatively, the second aerial vehicle can be onboard another aerial vehicle having previously flown the final approach to the runway.

At (904), the method 900 can include determining, by the one or more computing devices, an actual flight path for the final approach based, at least in part, on a second data set. Specifically, in example embodiments, the second data set can include a time-of-flight measurement for each light beam of a second plurality of light beams emitted from a light source of a LIDAR scanner mounted to the aerial vehicle. In addition, the second plurality of light beams can be emitted when the aerial vehicle is flying the final approach to the runway. In this way, each light beam of the second plurality of light beams can reflect off a ground surface or ground object positioned on the final approach. Furthermore, the reflected light beams can be collected by a sensor of the LIDAR scanner mounted to the aerial vehicle.

At (906), the method 900 can include determining, by the one or more computing device(s), whether the actual flight path deviates from the reference flight path based, at least in part, on the first data set and the second data set. Specifically, in example embodiments, the computing device(s) can compare a first time-of-flight measurement included in the first data set against a second time-of-flight measurement included in the second data set. It should be appreciated that a location identifier assigned to the first time-of-flight measurement can match a location identifier assigned to the second time-of-flight measurement. As such, if the second time-of-flight measurement deviates from the first time-of-flight measurement by a predetermined amount, then the method 900 can proceed to (908). Otherwise, the method 900 can continue to compare time-of-flight measurements included in the first data set against time-of-flight measurements included in the second data set.

At (908), the method 900 can include generating, by the one or more computing device(s), a control action to adjust operation of the aerial vehicle. More specifically, the control action can adjust operation of the aerial vehicle until the computing device(s) determine the actual flight path no longer deviates from the reference flight path. In addition, the control action can vary depending on how the actual flight path varies from the reference flight path. For example, if the actual flight path is above the reference flight path, the computing device(s) can generate a control action that causes the aerial vehicle to descend until the actual flight path matches the reference flight path.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

This written description uses examples to disclose example embodiments of the present disclosure, including making and using any devices or systems and performing any incorporated methods. The patentable scope of the present disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A landing system for controlling operation of an aerial vehicle flying a final approach to a runway, the landing system comprising:
a LIDAR scanner mounted to the aerial vehicle; and
one or more computing device(s) configured to:
obtain a first data set indicative of a reference flight path for the final approach to the runway, the first data set comprising a time-of-flight measurement for each light beam of a first plurality of light beams emitted prior to the aerial vehicle flying the final approach;
determine an actual flight path for the final approach based, at least in part, on a second data set comprising a time-of-flight measurement for each light beam of a second plurality of light beams emitted from a light source of the LIDAR scanner when the aerial vehicle is flying the final approach;
determine whether the actual flight path deviates from the reference flight path based, at least in part, on the first data set and the second data set; and
when the actual flight path deviates from the reference flight path by a predetermined amount, generate a control action to adjust operation of the aerial vehicle until the actual flight path no longer deviates from the reference flight path by the predetermined amount.

2. The landing system of claim 1, wherein each light beam of the second plurality of light beams reflect off a ground surface or ground object positioned on the final approach, and wherein the reflected light beams are collected by a sensor of the LIDAR scanner.

3. The landing system of claim 2, wherein each light beam of the first plurality of light beams is emitted from a light source of a LIDAR scanner mounted to a second aerial vehicle, and wherein each light beam of the first plurality of light beams is reflected off the ground surface or ground object and collected by a sensor of the LIDAR scanner mounted to the second aerial vehicle.

4. The landing system of claim 3, wherein the second aerial vehicle is a satellite orbiting the Earth.

5. The landing system of claim 3, wherein the first data set further comprises a location identifier assigned to each time-of-flight measurement included in the first data set, and wherein the second data set further comprises a location identifier assigned to each time-of-flight measurement included in the second data set.

6. The landing system of claim 5, wherein the location identifier for each time-of-flight measurement included in the second data set includes data from an inertial measurement unit (IMU) of the aerial vehicle and data from a global positioning system (GPS) of the aerial vehicle.

7. The landing system of claim 6, wherein the location identifier further comprises data from a radio altimeter of the aerial vehicle.

8. The landing system of claim 5, wherein when the computing device(s) determine whether the actual flight path deviates from the reference flight path, the computing device(s) are configured to compare the first data set against the second data set.

9. The landing system of claim 8, wherein when the computing device(s) compare the first data set against the second data set, the computing device(s) are configured to compare a first time-of-flight measurement included in the first data against a second time-of-flight measurement included in the second data set, and wherein the location identifier assigned to the first time-of-flight measurement matches the location identifier assigned to the second time-of-flight measurement.

10. The landing system of claim 3, wherein the computing device(s) are further configured to update the reference flight path to reflect a change to the ground surface or ground object on the final approach to the runway.

11. The landing system of claim 10, wherein the one or more computing device(s) are configured to obtain the first data set from a database configured to store reference flight paths for a plurality of final approaches.

12. A method for controlling operation of an aerial vehicle flying a final approach to a runway when visibility is degraded due to an environmental condition, the method comprising:
obtaining, by one or more computing devices, a first data set indicative of a reference flight path for the final approach to the runway, the first data set comprising a time-of-flight measurement for each light beam of a first plurality of light beams emitted prior to the aerial vehicle flying the final approach;
determining, by the one or more computing devices, an actual flight path for the final approach based, at least in part, on a second data set comprising a time-of-flight measurement for each light beam of a second plurality of light beams emitted from a light source of a LIDAR scanner mounted to the aerial vehicle;
determining, by the one or more computing devices, whether the actual flight path deviates from the reference flight path based, at least in part, on the first data set and the second data set; and
when the actual flight path deviates from the reference flight path by a predetermined amount, generating, by the one or more computing devices, a control action to adjust operation of the aerial vehicle until the actual flight path no longer deviates from the reference flight path by the predetermined amount,
wherein the second plurality of light beams are emitted from the light source when the aerial vehicle is flying the final approach.

13. The method of claim 12, wherein each light beam of the second plurality of light beams reflect off a ground surface or ground object positioned on the final approach, and wherein the reflected light beams are collected by a sensor of the LIDAR scanner.

14. The method of claim 13, wherein each light beam of the first plurality of light beams is emitted from a light source of a LIDAR scanner mounted to a second aerial vehicle, and wherein each light beam of the first plurality of light beams is reflected off the ground surface or ground object and collected by a sensor of the LIDAR scanner mounted to the second aerial vehicle.

15. The method of claim 14, wherein the first data set further comprises a location identifier assigned to each time-of-flight measurement included in the first data set, and wherein the second data set further comprises a location identifier assigned to each time-of-flight measurement included in the second data set.

16. The method of claim 15, wherein the location identifier for each time-of-flight measurement included in the second data set includes data from an inertial measurement unit (IMU) of the aerial vehicle and data from a global positioning system (GPS) of the aerial vehicle.

17. The method of claim 15, wherein determining the actual flight path deviates from the reference flight path further comprises comparing, by the computing device(s), the first data set against the second data set.

18. The method of claim 17, wherein comparing the first data set against the second data set comprises comparing, by the one or more computing devices, a first time-of-flight measurement included in the first data set against a second time-of-flight measurement included in the second data set, and wherein the location identifier assigned to the first time-of-flight measurement matches the location identifier assigned to the second time-of-flight measurement.

19. The method of claim 13, wherein the method further comprises updating, by the one or more computing devices, the reference flight path to reflect a change to the ground surface or ground object on the final approach to the runway.

20. The method of claim 12, wherein the change to the ground surface or ground object can be determined based, at least in part, deviation of the second data set from the first data set.

* * * * *